US011204910B2

(12) United States Patent
Carbajales et al.

(10) Patent No.: US 11,204,910 B2
(45) Date of Patent: Dec. 21, 2021

(54) ARTIFACT CORRELATION BETWEEN DOMAINS

(71) Applicant: International Business Machines Corporation, Armonk, NY (US)

(72) Inventors: Sebastian Carbajales, Toronto (CA); Dao-Quynh L. Dang, Fountain Valley, CA (US); Khoi Dang, Fountain Valley, CA (US); Sascha Schwarze, Hildrizhausen (DE); Thomas J. Watson, Riverside, CA (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 16/013,992

(22) Filed: Jun. 21, 2018

(65) Prior Publication Data

US 2018/0300366 A1  Oct. 18, 2018

Related U.S. Application Data

(63) Continuation of application No. 14/711,141, filed on May 13, 2015, now Pat. No. 10,037,351.

(30) Foreign Application Priority Data

Jun. 11, 2014 (CA) .................................... 2854022

(51) Int. Cl.
*G06F 16/00* (2019.01)
*G06F 16/23* (2019.01)

(52) U.S. Cl.
CPC ................. *G06F 16/2329* (2019.01)

(58) Field of Classification Search
CPC ................. G06F 8/71; G06F 16/2329
See application file for complete search history.

(56) References Cited

U.S. PATENT DOCUMENTS 7,266,565 B2 * 9/2007 Diab .................... G06F 8/24
7,774,831 B2 * 8/2010 Kuznetsov ............ G06F 9/546
726/12

(Continued)

FOREIGN PATENT DOCUMENTS

JP  10187560 A  7/1998
JP  200592544 A  4/2005
JP  2010231714 A  10/2010

OTHER PUBLICATIONS

List of IBM Patents or Patent Applications Treated as Related, dated Jun. 20, 2018, 2 pages.

(Continued)

*Primary Examiner* — Usmaan Saeed
*Assistant Examiner* — David M Nafziger
(74) *Attorney, Agent, or Firm* — Scott S. Dobson

(57) ABSTRACT

An illustrative embodiment of a computer-implemented method for correlating artifacts between a versioned domain and an un-versioned domain, generates metadata having attributes of both of the versioned domain and the un-versioned domains, for an artifact in a set of artifacts; creates an instance using a specific version of a versioned artifact definition, wherein the instance comprises a first part directly created from the versioned artifact definition and a second part created from an un-versioned artifact definition; specifies linkages between a respective representation of the artifact in the versioned domain and the un-versioned domain; provides a set of facades through which a selected one of author, execute and update instances of the artifact is performed using either the versioned domain or the un-versioned domain; and correlates all versions of the artifact definition to a single un-versioned definition.

17 Claims, 12 Drawing Sheets

(56) References Cited

U.S. PATENT DOCUMENTS

| | | | |
|---|---|---|---|
| 7,840,936 B2 | 11/2010 | Seeger et al. | |
| 7,870,276 B1 | 1/2011 | Leung | |
| 8,392,464 B2* | 3/2013 | Bloesch | G06F 16/284 |
| | | | 707/796 |
| 8,453,052 B1 | 5/2013 | Newman et al. | |
| 8,863,299 B2* | 10/2014 | Sharma | H04L 9/0822 |
| | | | 726/26 |
| 9,461,876 B2* | 10/2016 | Van Dusen | G06N 5/04 |
| 2002/0198885 A1 | 12/2002 | Streepy, Jr. | |
| 2006/0236319 A1 | 10/2006 | Pinnix et al. | |
| 2007/0143744 A1 | 6/2007 | Clemm et al. | |
| 2008/0082974 A1 | 4/2008 | Ellison | |
| 2008/0091837 A1 | 4/2008 | Langen et al. | |
| 2011/0209159 A1 | 8/2011 | Baratz et al. | |
| 2011/0238402 A1 | 9/2011 | Kotani et al. | |
| 2012/0130906 A1* | 5/2012 | Klinker | G06Q 10/103 |
| | | | 705/301 |
| 2012/0254828 A1* | 10/2012 | Aiylam | G06F 8/51 |
| | | | 717/104 |
| 2013/0074038 A1* | 3/2013 | Fox | G06F 8/70 |
| | | | 717/122 |
| 2014/0280323 A1 | 9/2014 | Seales | |
| 2015/0039573 A1 | 2/2015 | Bhattacharjee et al. | |
| 2015/0088822 A1 | 3/2015 | Raja et al. | |
| 2015/0120621 A1 | 4/2015 | Alkov et al. | |
| 2015/0179082 A1 | 6/2015 | Byron et al. | |
| 2015/0363453 A1 | 12/2015 | Carbajales et al. | |
| 2016/0196289 A1 | 7/2016 | Lafreniere et al. | |
| 2017/0039038 A1 | 2/2017 | Huber et al. | |

OTHER PUBLICATIONS

International Search Report and Written Opinion dated Oct. 6, 2015, for International Application No. PCT/IB2015/054380, 7 pages.
Carbajales et al., "Artifact Correlation Between Domains," Canada Application No. 2854022, filed Jun. 11, 2014.

* cited by examiner

ARTIFACT CORRELATION BETWEEN DOMAINS

CROSS-REFERENCE TO RELATED APPLICATION

This application is related to and claims the benefit of Canada Patent Application No. 2,854,022, filed Jun. 11, 2014, which application is incorporated by reference herein for all purposes.

BACKGROUND

This disclosure relates generally to business process management and case management in a data processing system and more specifically to correlating artifacts defined and instantiated in a versioned domain to an un-versioned domain in the data processing system.

Organizations produce content, or information, and often do this through some type of process, in which the process is formally defined and executed by a system, or implicit through human interactions between employees and with clients and/or partners. Content and processes are key to a business of an organization therefore software systems are used to formalize these processes as well as enable the cataloging and collection of information vital to the operation of an organization.

Therefore, there is a requirement to architect the process and data definitions to enable use in building applications, both internal and external, required for the organization to conduct business successfully. This is not only true for documentation and processes, but also any type of artifact, or metadata, that defines what constitutes core concepts of the organization. There are two choices on how metadata is captured in software systems: versioned and un-versioned.

The versioned approach captures a relationship and chronology, or evolution, of a particular artifact. This approach is useful when each particular version is important to the operation of the system and must be accessible independent of other variations of the same metadata (i.e. versions). Processes are an example. These processes generally define well-structured flows, or relationship between activities. Processes are also often short lived and multiple instances of the same process may be executed concurrently. As a result, the respective definition may benefit from a versioned approach enabling multiple instances to continue to execute without the risk of failing due to an unexpected or incompatible change. At the same time, new versions can improve the process and allow new instances to immediately benefit from the improvement without the risk of affecting instances already in progress. For example, the process that deals with an insurance claim may evolve over time. As the new version is defined, the new version can be rolled out while instances of the older versions continue to run to completion. The versioned approach allows for this flexibility.

The un-versioned approach basically states there is only one version of the metadata, and that version of the metadata evolves over time. Content, or information, may be better suited to this approach. A document, once created, will typically be long lived. For example, an insurance policy definition may only include a few attributes when first defined, but as the business of the insurance company grows a need to enhance the information captured by the policy occurs while, at the same time, older policies must remain accessible and processed by newer systems that work with the old policies. Unlike process definitions, document definitions typically benefit from a single version that continues to evolve with the business. This is especially true with regard to information mining. When a document definition has several versions, the document becomes harder to search for and federate instances that correlate to what is essentially a single document definition. Therefore, having only one document definition be a common link between all documents in the system is an important attribute.

Depending upon the nature of the concept, there will be limitations with either approach for some aspect of what is being defined. Consider data generated by a process. The process itself, which is expected to evolve rapidly, can typically only be implemented with a versioned approach due to the speed at which the process evolves and an associated requirement to maintain several instances running concurrently. However, the information associated with the process, or properties, is typically better suited to use of the un-versioned approach. Using the example of the insurance claim process, documents and data may be produced that must live long after the process has completed (and several new versions of the process have already been deployed), but the information must also be searchable and relatable to the single claims process that created the information. In general terms, this can be thought of as two sides of the same coin. Metadata of an organization might, in some instance, need to behave or be accessed as versioned (the process to resolve a claim) and, in other cases, as un-versioned (the data associated with the claim in progress or resolved).

SUMMARY

According to one embodiment, a computer-implemented method for correlating artifacts between a versioned domain and an un-versioned domain, generates metadata having attributes of both of the versioned domain and the un-versioned domains, for an artifact in a set of artifacts wherein the metadata is associated with the set of artifacts used in the versioned domain and the un-versioned domain; creates an instance using a specific version of a versioned artifact definition, wherein the instance comprises a first part directly created from the versioned artifact definition and a second part created from an un-versioned artifact definition; specifying linkages between a respective representation of the artifact in the versioned domain and the un-versioned domain, wherein a specified linkage defines a relationship between multiple versions of an artifact in the versioned domain to a single un-versioned representation of a same artifact in the un-versioned domain; in response to providing a set of facades used to perform a selected one of author, execute and update instances of the artifact from either the versioned domain or the un-versioned domain, receive the selected one of author, execute and update instances of the artifact from either the versioned domain or the un-versioned domain, wherein the selected one of author, execute and update instances of the artifact is performed using a set of rules; and correlates all versions of the artifact definition to a single un-versioned definition wherein the artifact definition of the single un-versioned definition is also correlated to all versions of the artifact definition.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
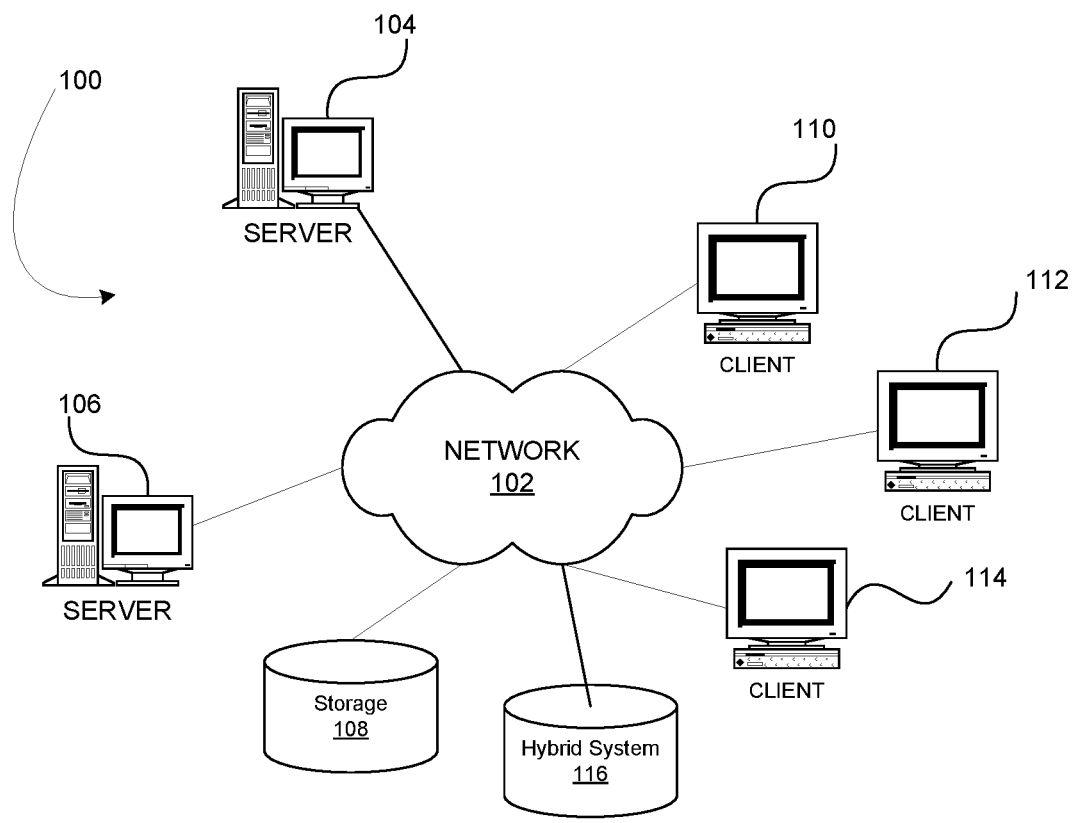
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied in which the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
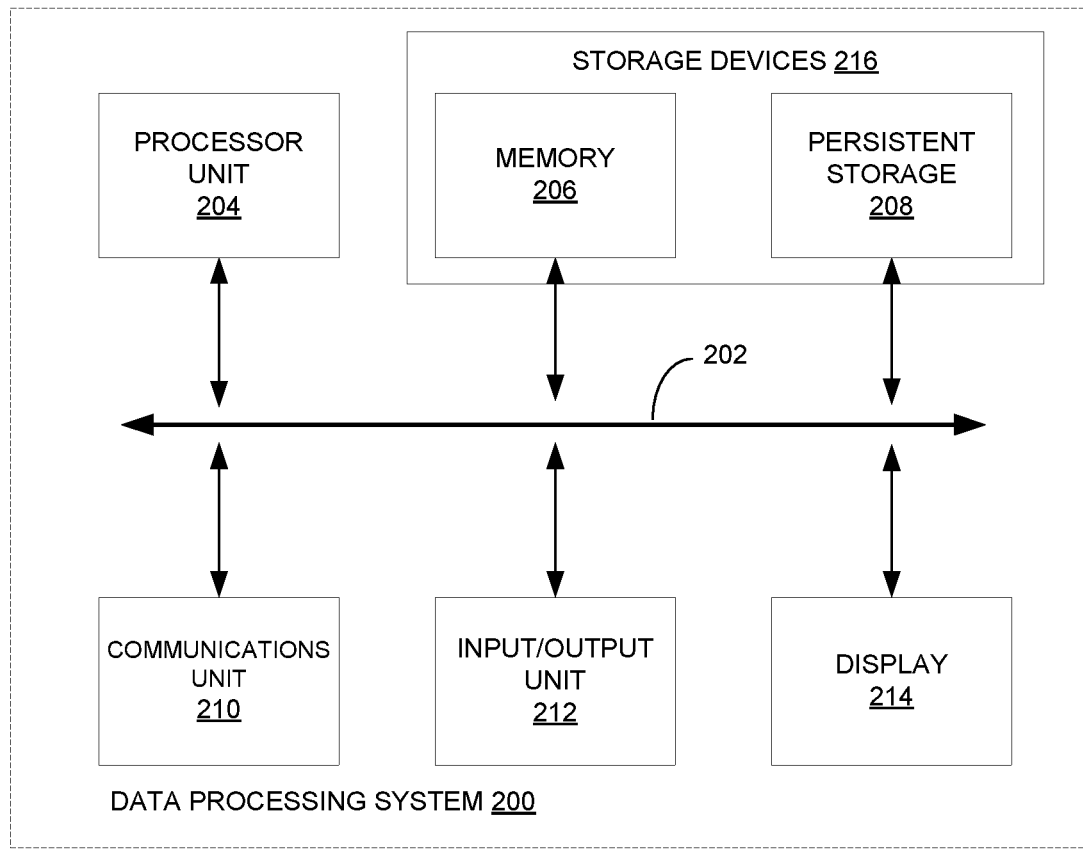
FIG. 2 is a block diagram of an exemplary data processing system operable for various embodiments of the disclosure.
Figure 2:
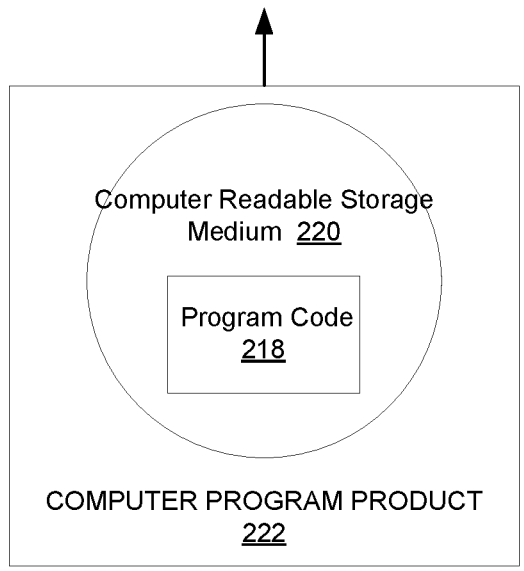

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 and have access through network 102 to hybrid system 116 containing data structures, rules and definitions applicable to versioned domains and un-versioned domains further described using this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/ output unit 212 may send output to a printer. Display 214 provides a mechanism to display information to a user.

Instructions in a computer executable form or computer readable form for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is may be selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable. Using the current example, program code 218 comprises computer-implemented instructions in an implementation of an embodiment of hybrid system 116 of FIG. 1.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for correlating artifacts between a versioned domain and an un-versioned domain is presented. Processor unit 204 generates metadata having attributes of both of the versioned domain and the un-versioned domains, for an artifact in a set of artifacts wherein the metadata is associated with the set of artifacts used in the versioned domain and the un-versioned domain.

Processor unit 204 creates an instance using a specific version of a versioned artifact definition, wherein the instance comprises a first part directly created from the versioned artifact definition and a second part created from an un-versioned artifact definition.

Processor unit 204 specifies linkages between a respective representation of the artifact in the versioned domain and the un-versioned domain, wherein a specified linkage defines a relationship between multiple versions of an artifact in the versioned domain to a single un-versioned representation of a same artifact in the un-versioned domain. Processor unit 204 further in response to providing a set of facades used to perform a selected one of author, execute and update instances of the artifact from either the versioned domain or the un-versioned domain, receives the selected one of author, execute and update instances of the artifact from either the versioned domain or the un-versioned domain, wherein the selected one of author, execute and update instances of the artifact is performed using a set of rules. Processor unit 204 correlates all versions of the artifact definition to a single un-versioned definition wherein the artifact definition of the single un-versioned definition is also correlated to all versions of the artifact definition.

Figure 3:
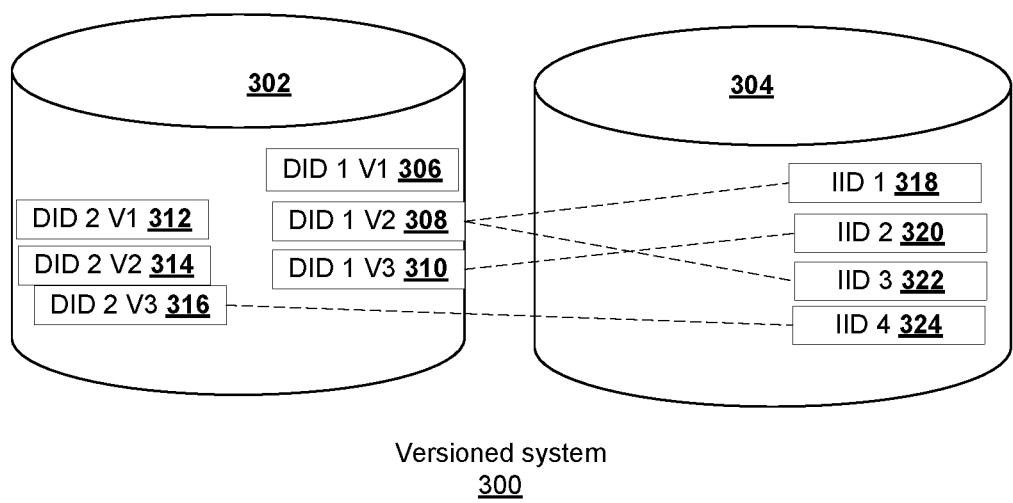
FIG. 3 is a block diagram of a versioned system operable for various embodiments of the disclosure.

With reference to FIG. 3 a block diagram of a versioned system operable for various embodiments of the disclosure is presented. FIG. 3 illustrates as an example a portion of hybrid system 116 of FIG. 1 in the form of versioned system 300 comprising definition versions and associated instances of two different artifacts.

An example of a proposed system to handle a combination of versioned and un-versioned usage is described by U.S. patent application publication US2012/0254828, in which an implementation depends upon creation of a single aggregation model maintaining a union of all data models for each version that can potentially be deployed to the system. This single aggregation model in turn is used during deployment and runtime to adapt the behavior of the system based on a device version being served. At runtime, the system operates on a single version of the data but understands how to work with the single version of the data using the aggregated model. The system as disclosed does not however maintain a relationship to an un-versioned instance of the same data. The aggregate model is therefore only a way to generically work with all versions deployed to the system.

In contrast with the cited patent application publication an embodiment of the disclosure defines a way to correlate versions of a model/instance data to one un-versioned model/instance data using unique identifiers. An embodiment of the disclosure does not use a third model to maintain this relationship. The implied relationships are defined between the un-versioned and versioned domains, each consisting of both artifact definitions (representative of design or development time) and instance data (representative of runtime). These domains are maintained concurrently by the system. An embodiment of the disclosure also defines rules applicable to modifying the definition at design time, as well manipulating instance data at runtime, on either domain.

At design (development) time a correlation operation is performed on the model definitions (versioned and un-versioned) to ensure all definitions on the versioned domain are compatible with the corresponding definition in the un-versioned domain. In other words, ensuring the instance data corresponding to each domain can be represented the same way. An embodiment of the disclosure defines the rules for applying changes to the un-versioned definition based on a corresponding change to a versioned definition.

At runtime, an embodiment of the disclosure defines a method to correlate versioned and un-versioned instance data, backed by the corresponding versioned and un-versioned definitions, both coexisting side by side for the purpose of reading and writing the versioned and un-versioned instance data. That is, an embodiment of the disclosure defines both a facade for reading and writing the versioned instance data as well as another facade for reading and writing the un-versioned instance data. In addition, an embodiment of the disclosure defines the rules for how updates applied to the versioned data are propagated to the un-versioned data, and vice versa. Finally, an embodiment of the disclosure defines how constraints are defined and applied when the versioned or un-versioned instance data is updated.

Cases are defined as a collection of information and activities. The respective activities are captured in a process definition and the information as documents in, and properties of, a case folder.

Processes are versioned, for the reasons stated previously. Processes need to evolve quickly and without breaking existing instances. Therefore isolation through versions enables an application to progress without difficulty. On the other hand, the information related to a case is long lived. All instances of this information are associated to a single definition of its structure in the form of a folder or document class.

Embodiments of the disclosure achieve a unified model having both versioned and un-versioned attributes. A versioned system is able to capture the evolution of a definition of an artifact through time. The versioned system typically captures the chronological order of these versions. As a result, the versioned system inherently provides the necessary element to compare and merge changes from one version to another as a means to evolve the definitions, but more importantly, as a way to migrate instances associated with a particular prior definition into the structure of another later definition. Although the versioned system typically captures the chronological order of the versions the merging of attributes may also be performed without consideration for a chronological order of the versions because the compare and merge of changes from one version to another is not dependent upon chronological order.

Aside from metadata, as outlined above, versioned systems also provide isolation for instances of the definition of the artifact. That is, a system can instantiate a particular version of the artifact and have the particular version of the instantiated artifact coexists with instances of other versions of the same artifact. This isolation enables, for example, two versions of the same claim process to run in the same system without interfering with each other. New versions can be authored and executed, again, without risk to the existing instances in the system due to the separation provided through isolation.

In the abbreviations of FIG. 3, DID represents a definition identifier, V represents a version identifier, while IID represents an instance identifier. The storage devices, for example storage unit 108 of FIG. 1, containing versioned definitions 302 and versioned instances 304 are shown as separate units however the definition versions and associated instances may be readily stored on the same storage device, for example a relational database.

Versioned definitions associated with a first definition identifier, including versions 1 through 3, are shown as identifiers DID 1 V1 306, DID 1 V2 308 and DID 1, V3 310.

In a similar manner definitions associated with a second definition identifier also including multiple versions 1 through 3, are shown as identifiers DID 2 V1 312, DID 2 V2 314 and DID 2, V3 316.

Instances in the example are defined as instance identifiers IID 1 318, IID 2 320, IID 3 322, and IID 4 324. An instance is created from a specific definition version. In the current example, the instances associated with identifiers IID 1 318, IID 2 320, IID 3 322 are created using the specific definition versions associated with identifiers DID 1 V2 308, DID 1 V3 310 and DID 1 V2 308 respectively while the instance associated with identifier IID 4 324 is created using the specific definition version associated with identifier DID 2 V3 316. The association between a particular definition version and an instance created using the respective definition version is depicted in the figure using a dashed line.

Figure 4:
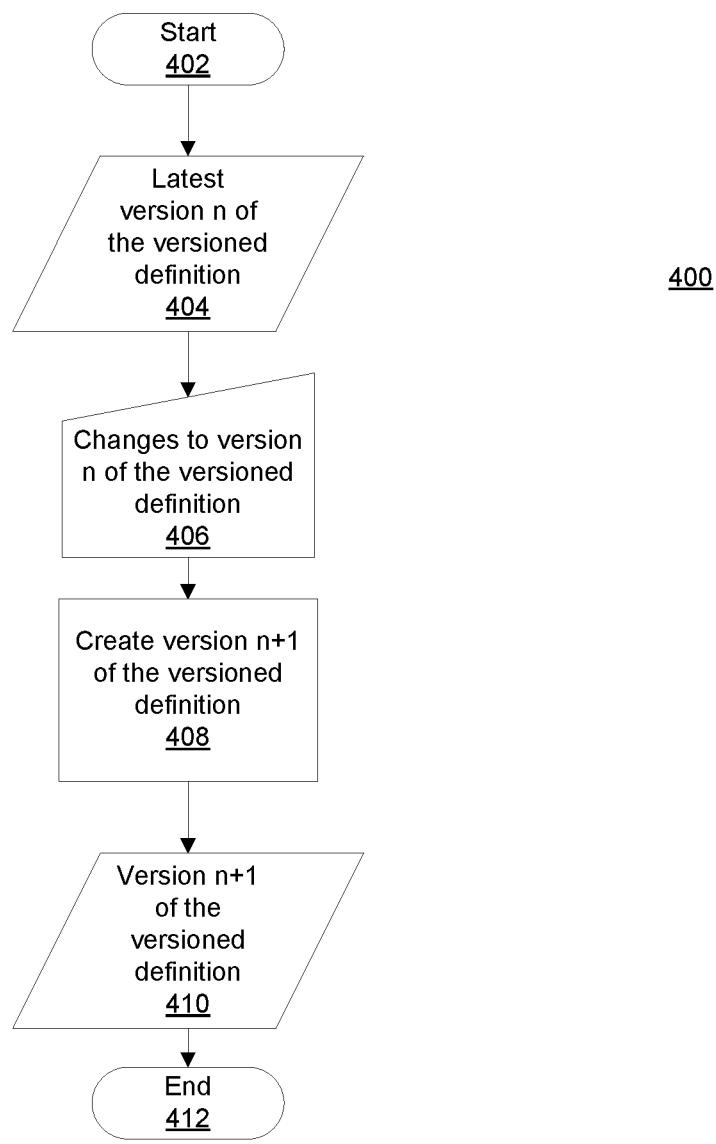
FIG. 4 is a flowchart of a process of creating a new version in a versioned system operable for various embodiments of the disclosure.

With reference to FIG. 4 a flowchart of a process of creating a new version in a versioned system operable for various embodiments of the disclosure is presented. FIG. 4 illustrates in a high level view a process using a portion of hybrid system 116 of FIG. 1 in the form of versioned system 300 of FIG. 3.

When creating a new version the following operations depicted in process 400 are required to create the new version of the definition of the artifact. Having a capability to create new versions implies the system also has a capability to maintain the relationship between versions.

Process 400 begins (step 402) and uses a latest version n of the versioned system, such as versioned system 300 of FIG. 3 step (404). Changes to version n of the versioned definition are received (step 406). The changes received are applied to the latest version n of the versioned system to create version n+1 of the versioned definition (step 408). The output generated is in the form of version n+1 of the versioned definition (step 410) and process terminates thereafter (step 412).

Ultimately, a versioned system enables instance migration. Instance migration requires comparison of two versions, a source version such as version n and a target version, such as version n+1 to determine how to morph the data to adapt an instance of the source version for execution using the new (target) definition version. Instance migration is typically difficult and sometimes impossible, depending on a type of change between versions.

Figure 5:
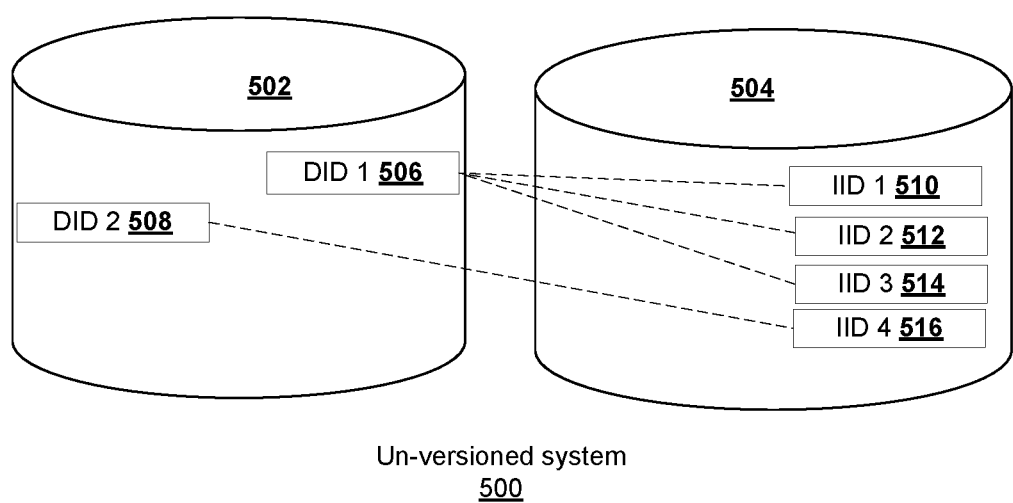
FIG. 5 a block diagram of an un-versioned system operable for various embodiments of the disclosure in accordance with one embodiment of the disclosure.

With reference to FIG. 5 a block diagram of an un-versioned system operable for various embodiments of the disclosure is presented. FIG. 5 illustrates in an example a portion of hybrid system 116 of FIG. 1 in the form of un-versioned system 500 comprising un-versioned definitions and associated instances of two different artifacts.

Therefore although versioning enables frequent deployment and evolution, without affecting execution, versioning is lacking in what is needed to maintain a federated view of the data captured by the collection of instances that spawn from the various versions. In contrast, un-versioned systems are much simpler. In an un-versioned system there is only one definition of an artifact. The definition evolves over time by virtue of introducing changes into the definition. However, there is also no concept of a checkpoint, or version, which would allow a user to see a progression of the artifact over time. In an un-versioned system, all instances of an artifact are associated with a single definition. Un-versioned system 500 illustrates the structure of an un-versioned system.

In the abbreviations of FIG. 5, DID represents a definition identifier, while IID represents an instance identifier. The storage devices, for example storage unit 108 of FIG. 1, containing un-versioned definitions 502 and instances 504 are shown as separate units however the definition versions and associated instances may be readily stored on the same storage device, for example a relational database.

Similar to the naming conventions shown in FIG. 3 un-versioned definitions associated with a first definition and a second definition of un-versioned definitions 502 are shown as identifiers DID 1 506 and DID 2 508. However in this case there is no version included in the definition identifier.

Instances in the example of un-versioned instances 504 are defined as instance identifiers IID 1 510, IID 2 512, IID 3 514, and IID 4 516. An instance is created from a specific definition. In the current example, the instances associated with identifiers IID 1 510, IID 2 512, IID 3 514 of un-versioned system 500 are created using the specific definition associated with identifier DID 1 506, while the instance associated with identifier IID 4 516 is created using the specific definition associated with identifier DID 2 508. The association between a particular definition version and an instance created using the respective definition version is depicted in the figure using a dashed line.

Figure 6:
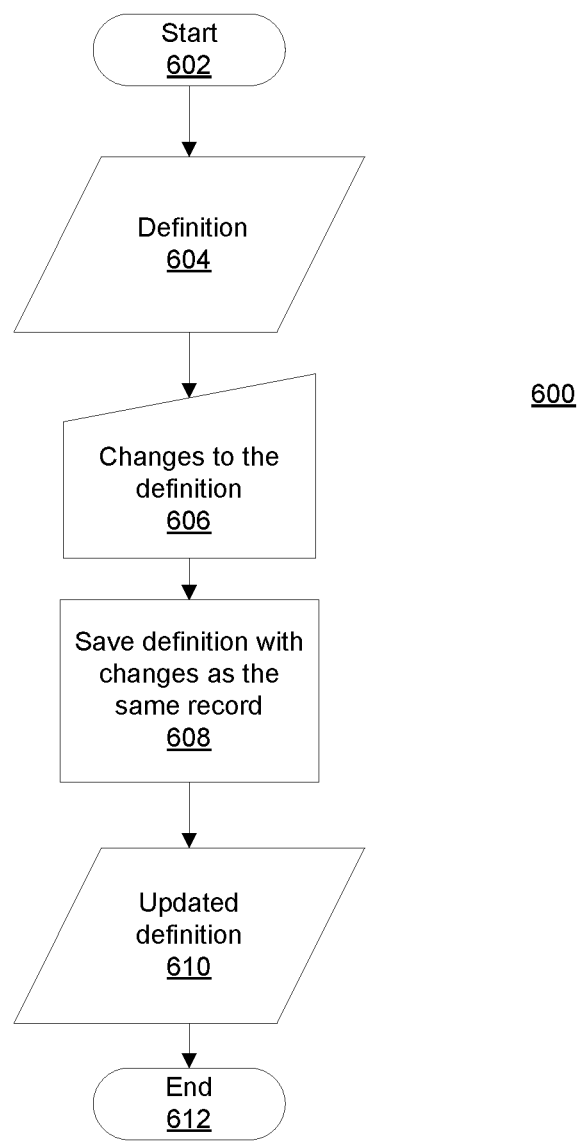
FIG. 6 is a flowchart of a process of changing a definition in an un-versioned system operable for various embodiments of the disclosure.

With reference to FIG. 6 a flowchart of a process of changing a definition in an un-versioned system operable for various embodiments of the disclosure is presented. FIG. 6 illustrates in a high level view a process of the evolution of an un-versioned artifact definition using a portion of hybrid system 116 of FIG. 1 in the form of un-versioned system 500 of FIG. 5.

When changing an artifact definition the following operations depicted in process 600 are required to create the changed definition of the artifact. Having a capability to change the un-versioned definition implies the system also has a capability to maintain the changes in the updated definition.

Process 600 begins (step 602) and uses a un-versioned definition of the artifact in the un-versioned system, such as un-versioned system 500 of FIG. 5 step (604). Changes to un-versioned artifact definition are received (step 606). The changes received are applied to the un-versioned artifact definition of the un-versioned system and saved to the same record as the original un-versioned artifact definition (step 608). The output generated is in the form of an updated artifact definition of the originating un-versioned artifact definition (step 610) and process 600 terminates thereafter (step 612).

There is simplicity in that the un-versioned system does not need to manage the relationships among artifact versions. There is also simplicity in that all instances are backed by the same definition so there is no need for an explicit instance migration, of sorts. However, this simplicity comes at a cost.

The un-versioned system imposes restrictions on the types of updates that can be made to an artifact definition. Restrictions are needed because all existing instances must be compatible with corresponding update(s). The restrictions could be considered an implicit forced instance migration of all instances where the migration must always succeed and, as a result, limiting possible updates to be made. Unlike a versioned system where definitions can readily be changed, an un-versioned system has strict rules with regard to definition changes permitted. However when the rules are not followed user intervention is required to fix broken or incompatible instances.

Figure 7:
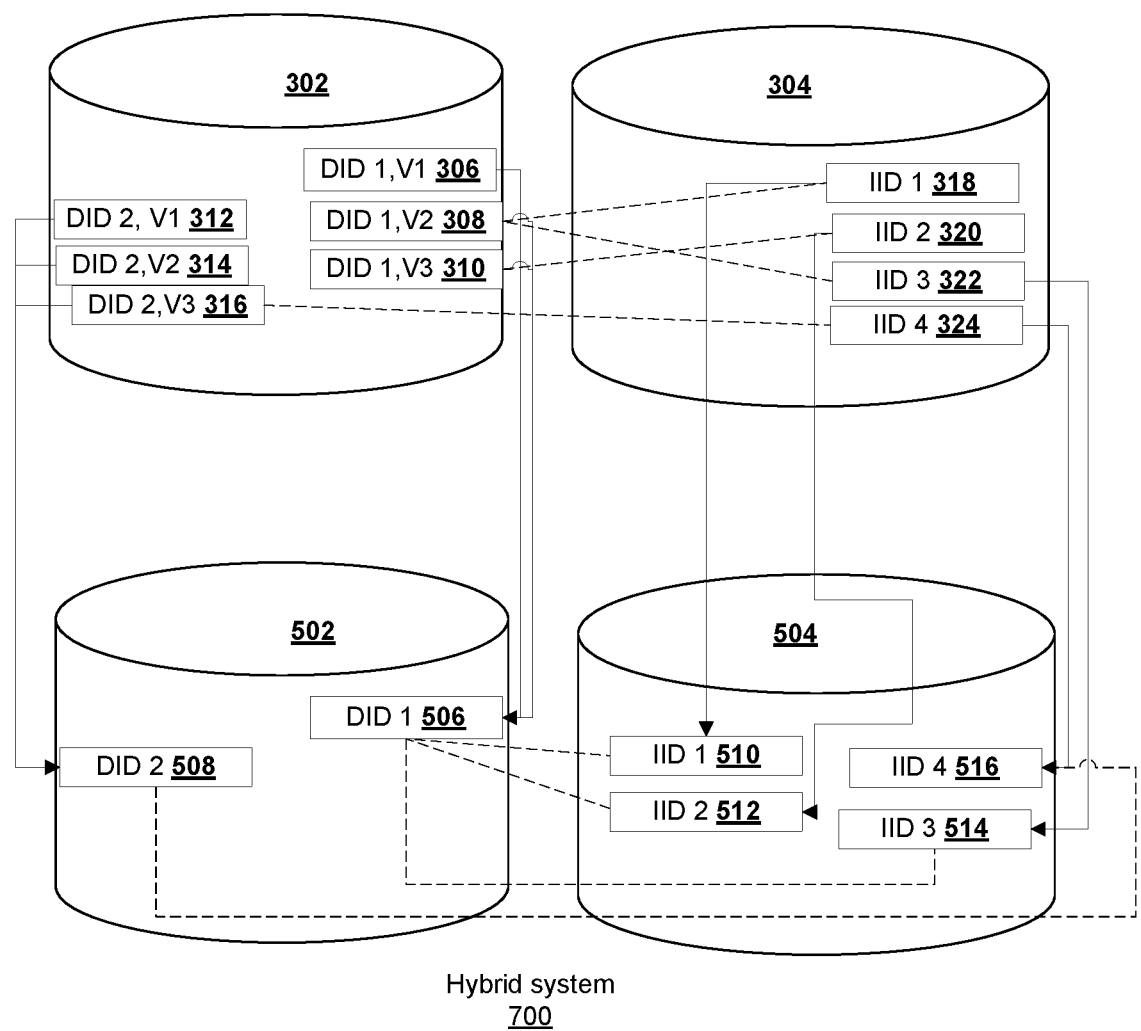
FIG. 7 a block diagram of a hybrid system operable for various embodiments of the disclosure.

Embodiments of the disclosure implement a method to use both the versioned and un-versioned approaches to define a hybrid system, for example, hybrid system 700 described in FIG. 7, that exhibits advantages of both properties. This is accomplished by establishing relationships between the versioned and un-versioned definitions, and rules governing how those relationships are used and evolve as an artifact matures.

With reference to FIG. 7 a block diagram of a hybrid system operable for various embodiments of the disclosure is presented. FIG. 7 illustrates as an example hybrid system 116 of FIG. 1 in the form of hybrid system 700 comprising artifact definitions in versioned and un-versioned forms and associated corresponding instances of two different artifacts.

Versioned definitions 302 and instances 304 are shown as separate units however the definition versions and associated instances may be readily stored on the same storage device as un-versioned definitions 502 and instances 504, for example a relational database.

As in versioned system 300 of FIG. 3, artifact definitions associated with a first versioned definition identifier, including versions 1 through 3, are shown as identifiers DID 1 V1 306, DID 1 V2 308 and DID 1, V3 310. In a similar manner versioned artifact definitions associated with a second versioned definition identifier also including multiple versions 1 through 3, are shown as identifiers DID 2 V1 312, DID 2 V2 314 and DID 2 V3 316.

As previously stated an instance is created from a specific definition version. Instances in the example are defined as instance identifiers IID 1 318, IID 2 320, IID 3 322, and IID 4 324. The instances associated with identifiers IID 1 318, IID 2 320, IID 3 322 of the example are created using the specific definition versions associated with identifiers DID 1 V2 308, DID 1 V3 310 and DID 1, V2 308 respectively while the instance associated with identifier IID 4 324 is created using the specific definition version associated with identifier DID 2 V3 316.

Similar to the naming conventions shown in FIG. 3 un-versioned definitions associated with a first definition and a second definition of un-versioned definitions 502 are shown as identifiers DID 1 506 and DID 2 508. However in the case of un-versioned system 500 there is no version included in the definition identifier.

Similar to the versioned portion of the system an instance is created from a specific definition, but a particular version is not. Instances, in the example, un-versioned instances 504 are defined as instances associated with identifiers IID 1 510, IID 2 512, IID 3 514, and IID 4 516. The instances associated with identifiers IID 1 510, IID 2 512, IID 3 514 of un-versioned system 500 are created using the specific definition associated with identifier DID 1 506, while the instance associated with identifier IID 4 516 is created using the specific definition associated with identifier DID 2 508.

Artifact definitions associated with identifiers DID 1 V1 306, DID 1 V2 308 and DID 1, V3 310 of versioned definitions 302 have a relationship identified with and are correlated with un-versioned definition DID 1 506. In a similar manner artifact definitions associated with identifiers DID 2 V1 312, DID 2 V2 314 and DID 2 V3 316 have a relationship identified with and are correlated with un-versioned definition DID 2 508.

Instance identifiers of instances 304 associated with versioned artifact definitions 302 associated with identifiers IID 1 318, IID 2 320, IID 3 322, and IID 4 324 also have relationships identified with and are correlated with un-versioned instances. In the current example, instance identifiers IID 1 318, IID 2 320, IID 3 322, and IID 4 324 of the versioned portion of hybrid system 700 are correlated with instances 504, associated with un-versioned artifact definitions 502 associated with identifiers IID 1 510, IID 2 512, IID 3 514, and IID 4 516 of the corresponding un-versioned portion of hybrid system 700.

As evident in the current example, correlation between a versioned and an un-versioned domain is maintained on two levels of correlation, a first at the artifact level (definitions) and a second at the attribute level (instances). This correlation is captured by associations of the artifacts through the use of unique identifiers and is applicable to both definitions and instances.

Artifact to artifact relationships and correlation between related artifacts in both domains is achieved using a simple unique identifier (UID) which includes an invariant component, or fragment, shared by all versions of a particular definition as well as a corresponding un-versioned definition. The UID is expressed in the following form when used in the versioned domain as: <common UID>_<version ID> and expressed when used in the versioned domain as: <common UID>.

The system can use the <common UID> fragment to easily identify all versions of the same artifact as well as the associated single un-versioned definition. The UID is immutable throughout the life of the artifact and is assigned when the artifact is first created and never changed. As shown in the example, DID is used to identify the article definition of a versioned definition as well as a respective corresponding un-versioned definition.

Figure 8:
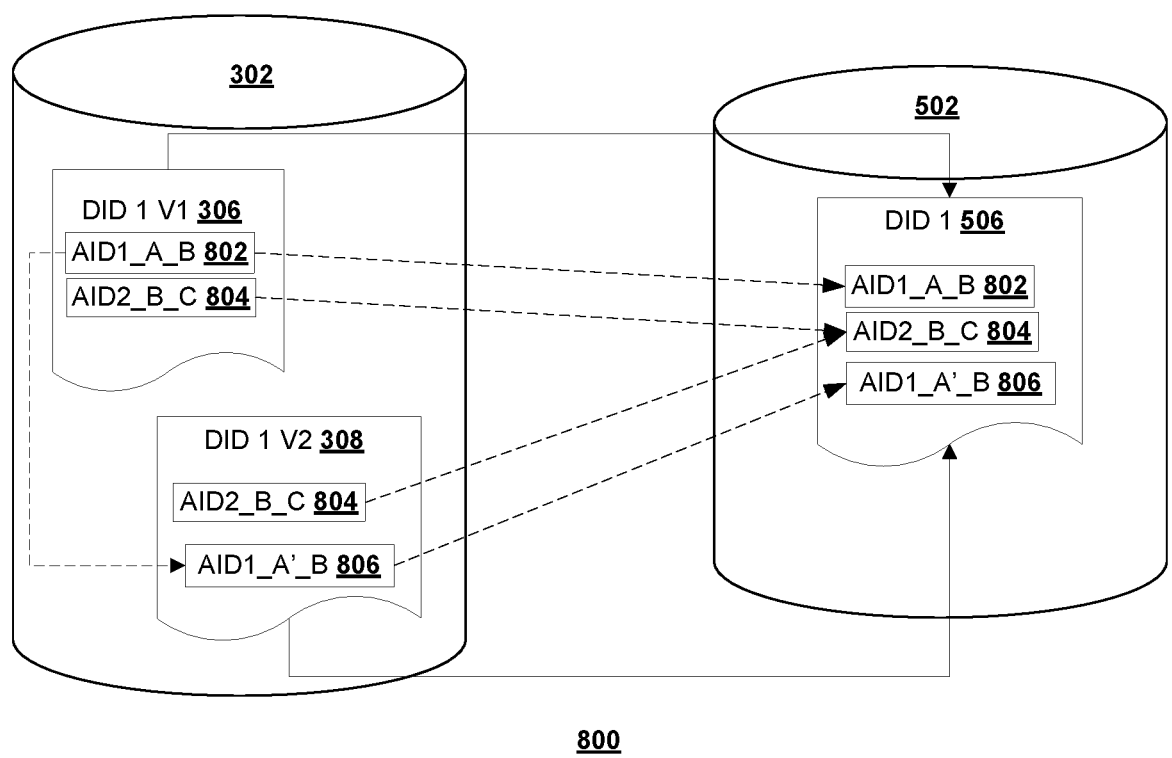
FIG. 8 is a block diagram of a hybrid system operable for various embodiments of the disclosure.

With reference to FIG. 8 a block diagram of a hybrid system operable for various embodiments of the disclosure is presented. FIG. 8 illustrates as an example hybrid system 116 of FIG. 1 in the form of hybrid system 800 comprising artifact definitions in versioned and un-versioned forms and associated corresponding instances of two different versions of an artifact including attribute-to-attribute relationships. In the example of hybrid system 800 the resulting relationships from various versions of an artifact to the single un-versioned definition are shown. In the abbreviations of FIG. 8, DID represents a definition identifier; V represents a definition identifier; while AID represents an attribute identifier and values A, B, C represent immutable facet values.

Hybrid system 800 illustrates a definitions portion of hybrid system 700 of FIG. 7 comprising versioned definitions 302 having a relationship identified with and are correlated with un-versioned definition 502.

Attribute to attribute relationship and correlation are performed once the relationship between a versioned and un-versioned artifact has been established, by applying the same principle used with artifact relationships to the attributes of the object. As in previous identification in artifact-to-artifact relationships and correlation, attributes are now identified by UID. The UID in this case now includes fragments generated from facets of the attribute that, when changed, make the instance data associated with the attribute incompatible with existing instances in the un-versioned domain. Therefore, these facets are considered immutable for the life of the definition. When these facets are changed in the versioned domain the change causes the system to identify the attribute as a new addition to a respective parent definition (as opposed to an update of an existing definition). The UID is shared by the versioned attributes and the un-versioned attributes in its entirety. The format of the UID is expressed as <UID>_<immutable facet 1 value>_ < . . . >_<immutable facet n value>. The <UID> fragment may be assigned by the system, or may be a value of an immutable facet.

For example, attribute1 has four facets comprised of A, B C and D. Of the four facets, changing two (B and C) causes the existing data associated with the attributes to be incompatible. As a result, the UID for attribute1 may be expressed as: <UID>_<value of B>_<value of C>. This expression ensures when either facet B or facet C are changed in the new version of the artifact, the corresponding un-versioned artifact receives a new attribute identified by <UID>_<value of B'>_<value of C'>.

By further example, a case property includes several facets, some of which may be: name, type, display name, cardinality and description. Each of these facets can be updated in the versioned domain without the risk of breaking existing instances for reason previously stated. However, the same change must also be applied to the un-versioned definition. As a result, the change cannot morph the property definitions to the extent that existing instance data is no longer compatible. For example, property1 is defined using the following facet values: Name: property1, Display name: Property1, Type: String, Cardinality: Multi value and Description: This is property 1. Changing either the display name or description has no bearing on the data. No matter what these attributes are, the list of string values can continue to be described by the property definition.

However, in the example, changing the facet value of type or cardinality of the property will create an incompatibility in the un-versioned definition. When the facet value of type is changed from string to integer, for example, the system can no longer guarantee all existing string instance data can be represented as an integer. Likewise, when the facet value of cardinality is changed, it is impossible to convert a list into a single value without data loss or unnatural morphing. As a result, type and cardinality are considered immutable and must be used in generating the properties UID.

Resulting UIDs for the example may be defined as follows, assuming the <UID> component is the property name, in a first case prior to the change as: property1_string_multi and in the second case after the change, wherein the type, cardinality or both are changed: property1_integer_multi, or property1_string_single, or property1_integer_single.

In the example of hybrid system 800, the resulting relationships from various versions of an artifact definition identified as DID 1 V1 306 and DID 1 V2 308 to the single un-versioned definition DID 1 506 are shown. The correlation between versioned and un-versioned artifact definitions further comprises attribute relationships.

With regard to definition DID 1 V1 306 attribute identifier AID1_A_B 802 is related to a changed value indicated in DID 1 V2 308 and attribute identifier AID1_A'_B 806 as shown using the dotted line. The relationship attribute identifier AID1_A_B 802 and attribute identifier AID1_A'_B 806 occurs due to the evolution from version to version as a result of changing the value of an immutable property A (to A'), which results in the creation of a new property AID1_A'_B 806 in un-versioned definition DID 1 506. The identification is used to maintain data compatibility as the versions evolve.

Further AID1_A_B 802 AID2_B_C 804 are related to AID1_A_B 802 AID2_B_C 804 in DID 1 506 of un-versioned definition DID 1 502.

With regard to definition DID 1 V2 308 attribute identifier AID2_B_C 804 and changed value indicated in attribute identifier AID1_A'_B 806 are related to AID2_B_C 804 and changed value indicated in attribute identifier AID1_A'_B 806 respectively in DID 1 506 of un-versioned definitions 502.

With regard to instance creation, an instance is always created from a specific version of the versioned artifact definition, but the instance is formed having has two parts:

one part directly created from the versioned artifact definition and the other part created from the un-versioned artifact definition. It is possible to lookup one part using the other part because both parts share a common ID attribute.

An instance can be migrated from one versioned definition to another version. In this case only the instance part created from the versioned definition needs to be migrated in the same way as described earlier for a versioned system.

Evolution of the artifact definition occurs and requires certain rules to be enforced to ensure compatibility of all un-versioned instances. The definition of validation rules, applied on the instance as data is updated is used to provide the basis of enforcement. An update of the artifact definition is propagated through the system as a new version of the definition is created and the corresponding un-versioned definition is also updated.

Attributes of an artifact definition may have validation rules defined, for example, a rule may express a numeric attribute does not permit negative values. Validation rules are only defined on the versioned artifact definition as they may evolve over time. Enforcement for instances is described in a further section.

Figure 9:
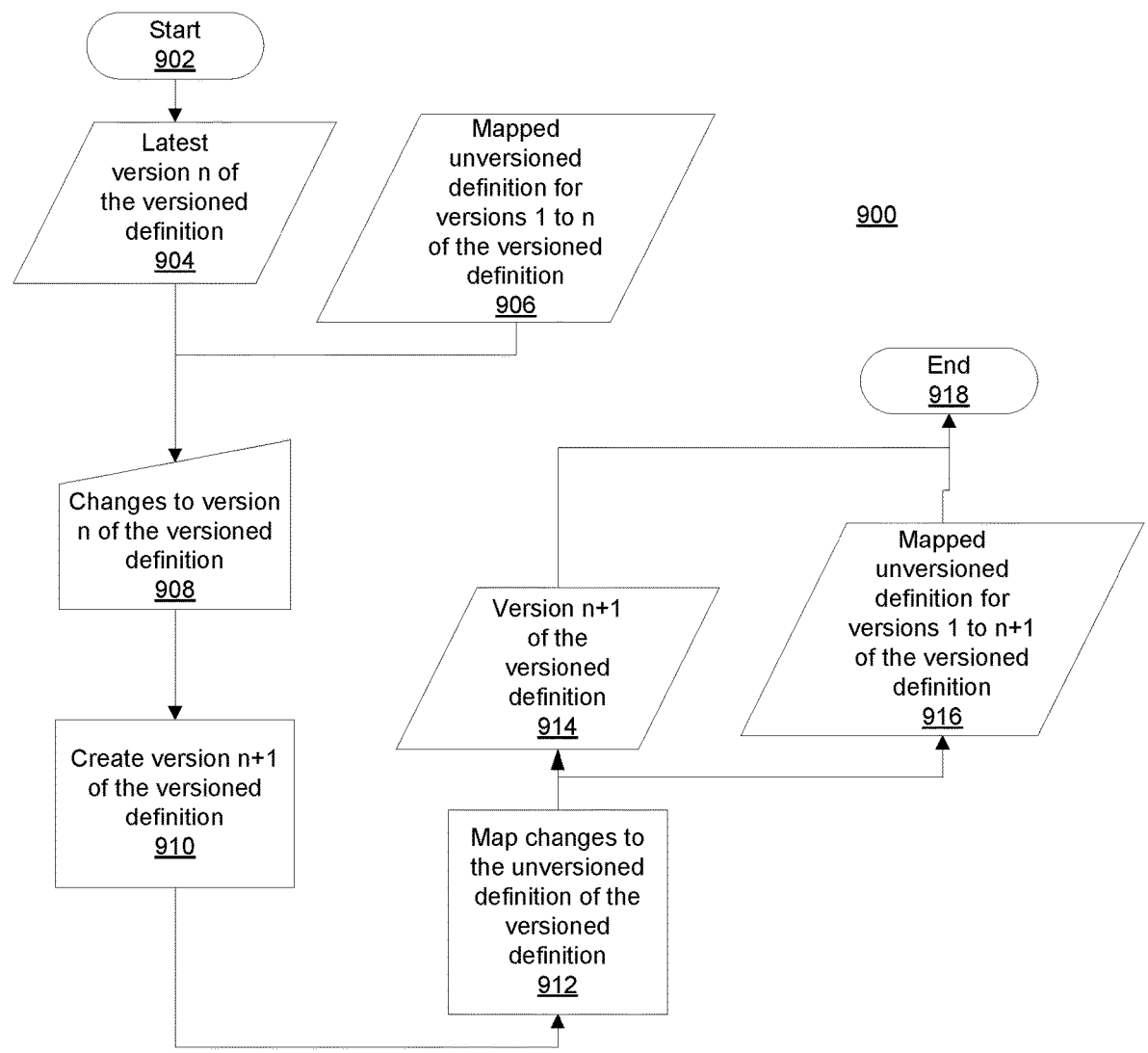
FIG. 9 is a flow chart of creating a new definition version in an un-versioned system portion a hybrid system operable for various embodiments of the disclosure

With reference to FIG. 9 a flow chart of creating a new definition version in an un-versioned system portion a hybrid system operable for various embodiments of the disclosure is presented. Process 900 illustrates as an example a process used in hybrid system 116 of FIG. 1 in the form of a portion of hybrid system 800 of FIG. 8 comprising an un-versioned system in which a definition is created.

Process 900 begins (step 902) and receives a latest version n of the versioned definition (step 904) and mapped un-versioned definition for version 1 to n of the versioned definition (step 906). Changes to version n of the versioned definition are also received (step 908).

Process 900 creates version n+1 of the versioned definition (step 910).

Updates to the artifact definition are only done in the versioned domain. When a user changes a latest version n of a definition a new version n+1 is created with the changes. Deltas can be additions, removals and changes. For each of the deltas a corresponding mapping to the un-versioned artifact definition must be made.

Removal of an attribute causes no change on the un-versioned artifact definition because the attribute is still used by earlier versions of the versioned definition and is, therefore, still needed. Addition of an attribute causes an attribute to also be added to the un-versioned definition having the same facets. One exception is a rare case in which a property with the same facets previously existed on a versioned definition lower than version n. Therefore the re-introduction of an attribute causes no change in the un-versioned artifact definition.

A change of an attribute may be synchronized to un-versioned definition depending on what has changed: when only validation rules of an attribute are changed, no update is made to the un-versioned artifact definition because attribute changes are exclusively kept in the versioned artifact definition; when a facet is changed and that change can be applied to the un-versioned artifact definition in a compatible way then the attribute in the un-versioned definition is changed. This mainly applies to data irrelevant changes, for example a change of a display name or description is acceptable where the un-versioned artifact definition only knows the latest definition; and when a facet is changed and that change cannot be applied to the un-versioned artifact definition in a compatible way then a new attribute is added to the un-versioned definition following the rules as defined in associated validation rules. This mainly applies to data relevant changes, for example a change of the type of an attribute from a number to a date that cannot be transformed.

Process 900 maps changes to the un-versioned definition of the versioned definition (step 912). Process 900 creates version n+1 of the versioned definition (step 914) and also creates mapped un-versioned definition for versions 1 to n+1 of the versioned definition (step 916) with process 900 terminating thereafter (step 918).

Figure 10:
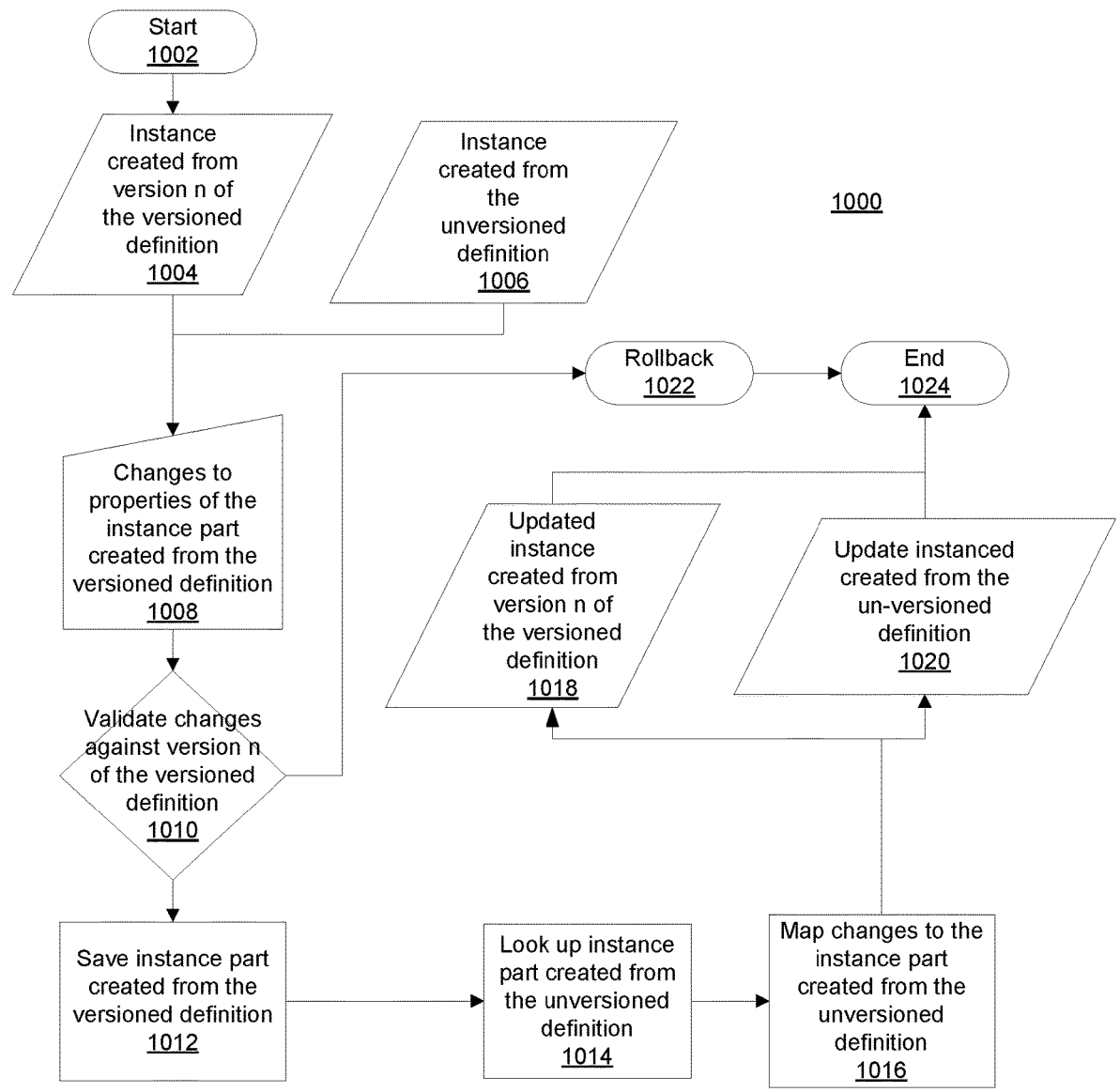
FIG. 10 is a flow chart of changing properties on the instance part created from a versioned definition in a hybrid system operable for various embodiments of the disclosure.

With reference to FIG. 10 a flow chart of changing properties on the instance part created from a versioned definition in a hybrid system operable for various embodiments of the disclosure is presented. Process 1000 illustrates as an example a process used in hybrid system 116 of FIG. 1 in the form of a portion of hybrid system 800 of FIG. 8 comprising an versioned system in which properties are changed in the instance part of the versioned definition.

Process 1000 begins (step 1002) and receives an instance created from version n of the versioned definition (step 1004) and receives an instance created from the un-versioned definition (step 1006). Process 1000 also receives changes to properties of the instance part created from the versioned definition (step 1008).

Process 1000 validates changes against version n of the versioned definition (step 1010). Responsive to a failure of the validation process 1000 rolls back the changes (step 1022) and terminates thereafter (step 1024). Responsive to a success of the validation process 1000 saves an instance part created from the versioned definition (step 1012). Process 1000 looks up the instance part created from the un-versioned definition (step 1014). Process 1000 maps changes to the instance part created from the un-versioned definition (step 1016).

Process 1000 creates updated instance from version n of the versioned definition (step 1018). Process 1000 also creates updated instance from un-versioned definition (step 1020). Process 1000 terminates thereafter (step 1024).

Updating instance data is performed using one of two facades: a façade for a versioned domain and a façade for a corresponding un-versioned domain. Depending on the domain upon which a client is operating, the client may attempt to interact with the instance of the artifact with a view of a respective versioned or un-versioned definition.

The versioned facade has access to only those attributes defined on the specific version of the versioned definition. Also, the versioned facade is directly aware of the validation rules defined for attributes of the specific definition version. Updates on the versioned facade can be directly validated against the definition version. When the updates are determined to be valid the corresponding attributes of the un-versioned facade are located and saved in the same transaction to keep the versioned as well as the un-versioned instances of the definition synchronized.

The versioned facade is mainly used to interact with the components of the definition that evolve quickly. For example, short-lived activities only see attributes with validation rules defined for the respective definition version, while the data on the longer-lived content is maintained in synchronization.

Figure 11:
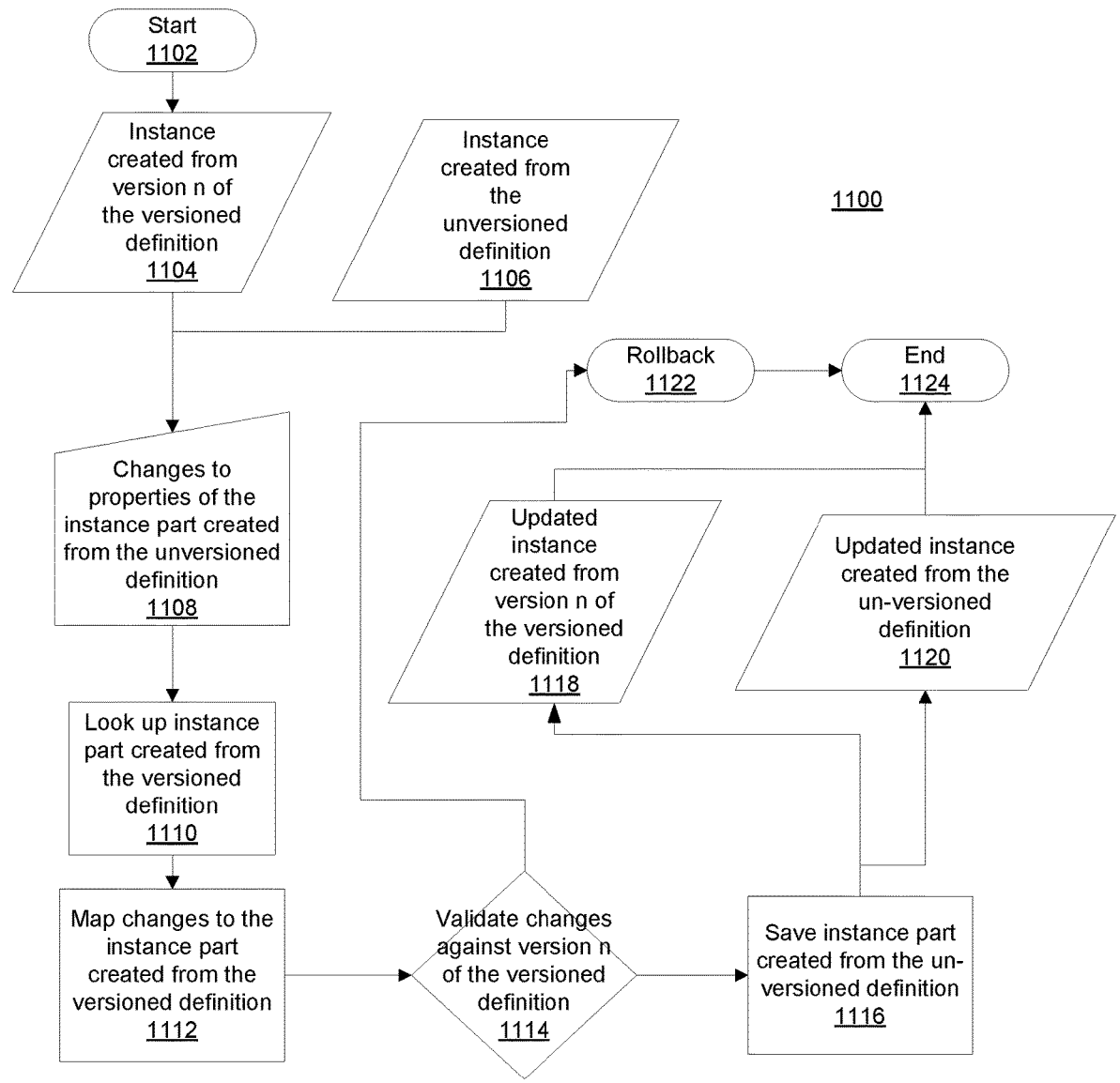
FIG. 11 is a flow chart of changing properties on the instance part created from an un-versioned definition in a hybrid system operable for various embodiments of the disclosure.

With reference to FIG. 11 a flow chart of changing properties on the instance part created from an un-versioned definition in a hybrid system operable for various embodiments of the disclosure is presented. Process 1100 illustrates as an example a process used in hybrid system 116 of FIG. 1 in the form of a portion of hybrid system 800 of FIG. 8 comprising an un-versioned system in which properties are changed in the instance part of the un-versioned definition.

Process 1100 begins (step 1102) and receives an instance created from version n of the versioned definition (step 1104) and receives an instance created from the un-versioned definition (step 1106). Process 1100 also receives changes to properties of the instance part created from the un-versioned definition (step 1108). Process 1100 looks up the instance part created from the versioned definition (step 1110). Process 1100 maps changes to the instance part created from the versioned definition (step 1112).

Process 1100 validates changes against version n of the versioned definition (step 1114). Responsive to a failure of the validation process 1100 rolls back the changes (step 1122) and terminates thereafter (step 1124). Responsive to a success of the validation process 1100 saves an instance part created from the un-versioned definition (step 1116).

Process 1100 creates updated instance from version n of the versioned definition (step 1118). Process 1100 also creates updated instance from the un-versioned definition (step 1120). Process 1100 terminates thereafter (step 1124).

Using the un-versioned façade effectively exposes the attributes defined in all versions of the versioned definition because the attributes defined in all versions of the versioned definition are all mapped to corresponding attributes in the un-versioned definition. The un-versioned definition, however, has no knowledge of the validation rules. When changes are made through the un-versioned facade the corresponding versioned facade is looked up. By mapping the changes made through the un-versioned facade to the corresponding versioned facade, the corresponding validation rules can be checked, as defined by the specific versioned definition. On failure the whole update is rolled back, otherwise both the updates to the versioned instance as well as the un-versioned instance are saved in one transaction The un-versioned facade is mainly used by longer living parts of the definition, including the content. A user focusing on the content can therefore use the un-versioned facade to view all attributes enabling the user to see attributes only defined for a few versions of the versioned definition. On update of an instance, the synchronization back to the versioned instance part, including validation of the changes against the versioned definition, enforces only valid changes are applied to the instance as defined by the version of a respective definition.

Figure 12:
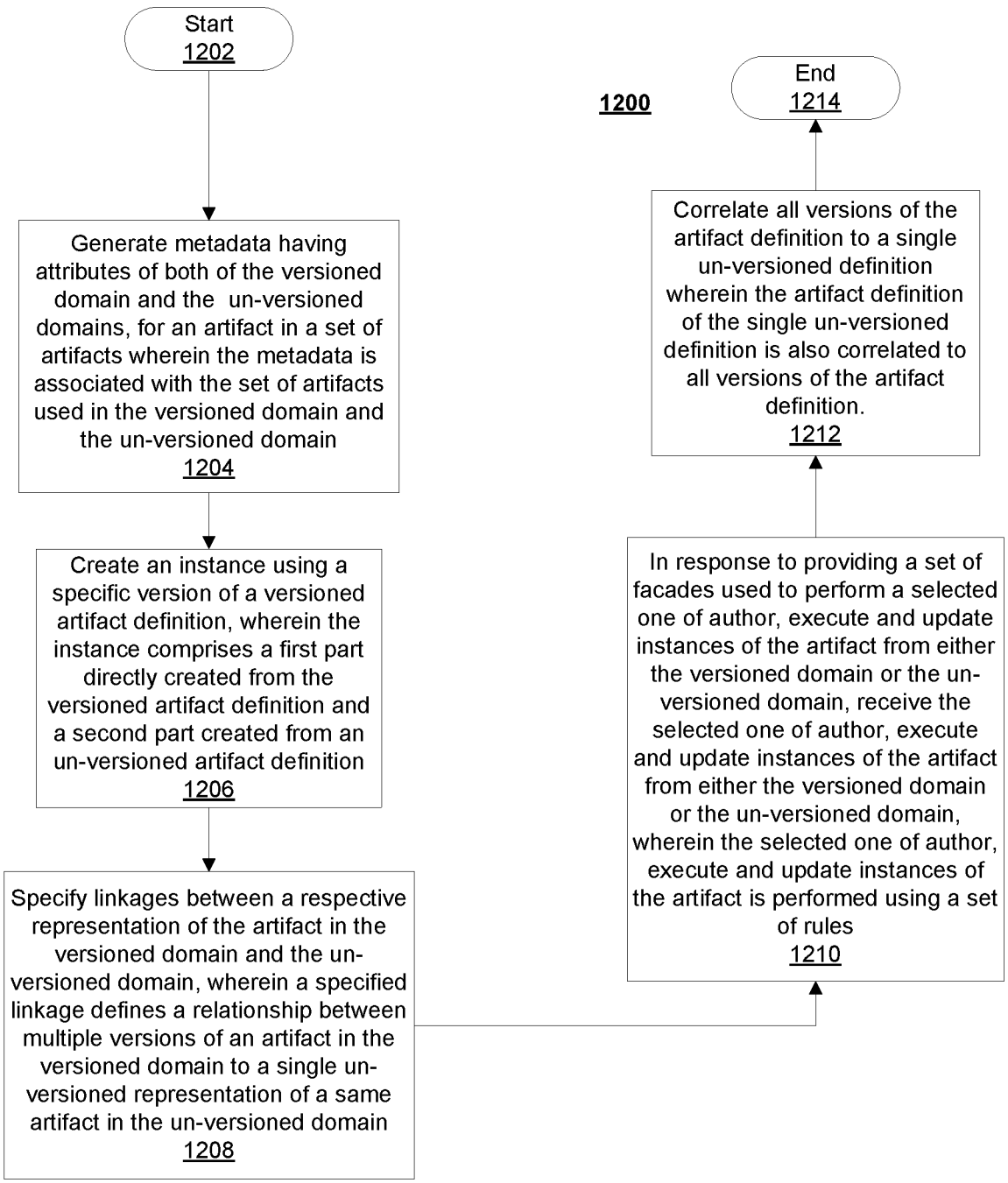
FIG. 12 a flow chart of a process for correlating artifacts between a versioned domain and an un-versioned domain in a hybrid system operable for various embodiments of the disclosure.

With reference to FIG. 12 a flow chart of a process for correlating artifacts between a versioned domain and an un-versioned domain in a hybrid system operable for various embodiments of the disclosure is presented. Process 1200 illustrates as an example a process used in hybrid system 116 of FIG. 1 in the form of a portion of hybrid system 800 of FIG. 8.

Process 1200 begins (step 1202) and generates metadata having attributes of both of the versioned domain and the un-versioned domains, for an artifact in a set of artifacts wherein the metadata is associated with the set of artifacts used in the versioned domain and the un-versioned domain (step 1204). Process 1200 creates an instance using a specific version of a versioned artifact definition, wherein the instance comprises a first part directly created from the versioned artifact definition and a second part created from an un-versioned artifact definition (step 1206). Process 1200 specifies linkages between a respective representation of the artifact in the versioned domain and the un-versioned domain, wherein a specified linkage defines a relationship between multiple versions of an artifact in the versioned domain to a single un-versioned representation of a same artifact in the un-versioned domain (step 1208). Process 1200 in response to providing a set of facades used to perform a selected one of author, execute and update instances of the artifact from either the versioned domain or the un-versioned domain, receives the selected one of author, execute and update instances of the artifact from either the versioned domain or the un-versioned domain, wherein the selected one of author, execute and update instances of the artifact is performed using a set of rules (step 1210). Process 1200 correlates all versions of the artifact definition to a single un-versioned definition wherein the artifact definition of the single un-versioned definition is also correlated to all versions of the artifact definition (step 1212) and terminates thereafter (step 1214).

Thus is presented in an illustrative embodiment a computer-implemented method for correlating artifacts between a versioned domain and an un-versioned domain. The computer-implemented method generates metadata having attributes of both of the versioned domain and the un-versioned domains, for an artifact in a set of artifacts wherein the metadata is associated with the set of artifacts used in the versioned domain and the un-versioned domain and creates an instance using a specific version of a versioned artifact definition, wherein the instance comprises a first part directly created from the versioned artifact definition and a second part created from an un-versioned artifact definition.

The method further specifies linkages between a respective representation of the artifact in the versioned domain and the un-versioned domain, wherein a specified linkage defines a relationship between multiple versions of an artifact in the versioned domain to a single un-versioned representation of a same artifact in the un-versioned domain.

A set of facades is provided for use to perform a selected one of author, execute and update instances of the artifact from either the versioned domain or the un-versioned domain, wherein the selected one of author, execute and update instances of the artifact is performed using a set of rules. All versions of the artifact definition are correlated to a single un-versioned definition wherein the artifact definition of the single un-versioned definition is also correlated to all versions of the artifact definition.

An illustrative embodiment provides a mechanism to architect metadata that has the attributes of both the versioned and un-versioned worlds. Furthermore, the illustrative embodiment specifies the linkages between the two sides, the rules required to author, execute and update instances of the artifacts from both the versioned or un-versioned views.

Illustrative embodiments do not define how to capture versions of an artifact, or how to define the single version of another. Those concepts are well understood and applied often in software systems today. Rather, the illustrative embodiment proposes how to link the two if the same artifact were represented in both domains and need to be accessed in both forms.

Illustrative embodiments define the relationship between the multiple versions of an artifact to the single un-versioned representation of the same, and exploit these relationships to make both sides work as one. Assuming that two systems capture the artifact definition itself (versioned and un-versioned), the illustrative embodiment describes a method to: correlate all versions of an artifact definition to its single un-versioned representation, and vice versa; correlate the attributes, or properties, definition of a particular artifact definition version to the same in the un-versioned representation, and the reverse; define editing semantic such as add, update and delete for the versioned artifact definition and the transformation to the editing semantic that is applied to the corresponding un-versioned artifact definition; define how read and update operations are performed on an instance of the artifact depending on whether these operations are executed on the versioned or un-versioned facade defined; define how data updates are synchronized between instances of the versioned and un-versioned artifact as one, or the other, is updated; and define how attribute, or property, validation rules are defined and evaluated when an artifact instance is updated through either the versioned or un-versioned facade.

The illustrative embodiment typically takes the best attributes of the versioned and un-versioned domains and provides a mechanism to exploit either one, as needed, in a single solution referred herein as a hybrid system. For a system that uses a versioned approach, federating information is much more difficult as all versions need to be consolidated into a common concept. For a system that uses an un-versioned approach, evolution is difficult because artifacts must always be backwards compatible and ensure existing instances are still valid with regards to updates in the metadata.

Using the hybrid approach proposed by the illustrative embodiment enables a definition of a system that can behave as versioned (evolution of a process) and un-versioned (consolidation of historical process data) typically without much more additional effort.

In another illustrated embodiment a method for correlating artifacts defined and instantiated in a versioned domain to an un-versioned domain, creates a correlation between related artifacts in a versioned domain and a un-versioned domain, using unique identifiers (UID) which include an invariant component, shared by all versions of a definition as well as an un-versioned definition, wherein the UID is expressed in a first form as Versioned: <common UID>_<version ID> and a second form as Un-versioned: <common UID> wherein a system uses the <common UID> fragment to identify all versions of a same artifact as well as an associated single un-versioned definition and wherein the UID is immutable throughout a life of an associated artifact; generates from facets of an attribute that, when changed, make the instance data associated with the attribute incompatible with existing instances in the un-versioned domain, wherein the specific facets are considered immutable for a life of the definition and when these are changed in the versioned domain the changes cause the system to identify the attribute as a brand new addition to a parent definition, wherein the UID is shared by both versioned attributes and un-versioned attributes in entirety and is expressed in a format of <UID>_<immutable facet 1 value>_ < . . . >_<immutable facet n value>; creates an instance using a specific version of a versioned artifact definition, wherein the instance comprises a first part directly created from the versioned artifact definition and a second part created from an un-versioned artifact definition; updates the artifact definition in the versioned domain, wherein a user change to a latest version n of the artifact definition creates a new version n+1 including the user change, wherein the user change is one of an addition, a removal and a modify and for each user change a corresponding mapping to the un-versioned artifact definition is made to synchronize the un-versioned artifact definition wherein: in response to a change in a validation rule in a set of validation rules associated with the attributes of the artifact definition, no update is made to the un-versioned artifact definition; in response to a facet change that can be applied to the un-versioned artifact definition in a compatible way the attribute in the un-versioned definition is also changed; and in response to a facet change that cannot be applied to the un-versioned artifact definition in a compatible way, a new attribute is added to the un-versioned definition using the set of predefined validation rules associated with the attributes of the versioned artifact definition; selects one of a versioned facade and an un-versioned facade to update instance data; in response to selecting the versioned facade accessing only those attributes defined on a specific version of the versioned definition and the set of validation rules defined for attributes of that specific version of the versioned definition; validates updates on that facade directly against the specific version of the versioned definition; in response to the updates being valid, corresponding attributes of the un-versioned facade are looked up and then saved in the same transaction to maintain synchronization between the versioned instances and the un-versioned instances of the definition; in response to selecting the un-versioned facade exposing the attributes defined in all versions of the versioned definition as mapped to the corresponding attributes in the un-versioned definition; in response to changes made through the un-versioned facade, performs a lookup in the corresponding versioned facade, wherein the changes are mapped to that corresponding versioned facade, the corresponding validation rules are checked, as defined by the specific versioned definition; in response to a successful update, saves the updates to the versioned instances as well as the un-versioned instances in a single transaction; and in response to a failure to update, the update is rolled back.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for correlating artifacts between a versioned domain and an un-versioned domain, comprising:
    generating metadata having attributes of both of the versioned domain and the un-versioned domains, for an artifact in a set of artifacts, wherein the metadata is associated with the set of artifacts used in the versioned domain and the un-versioned domain;
    creating an instance using a specific version of a versioned artifact definition, wherein the instance comprises a first part directly created from the versioned artifact definition and a second part created from an un-versioned artifact definition;
    specifying linkages between a respective representation of the artifact in the versioned domain and the un-versioned domain, wherein a specified linkage defines a relationship between multiple versions of an artifact in the versioned domain to a single un-versioned representation of a same artifact in the un-versioned domain;
    in response to providing a set of facades comprising a versioned facade to update instances of the artifact from the versioned domain:
        receive a selection of the versioned facade to update instance data,
        in response to receiving the selection of the versioned facade, accessing only those attributes defined on a specific version of the versioned definition and a set of predefined validation rules for attributes of that specific version of the versioned definition,
        validate updates on the versioned facade directly against the specific version of the versioned definition, and
        in response to the updates being valid, look up corresponding attributes of the un-versioned facade and save in a same transaction to maintain synchronization between the versioned instances and the un-versioned instances of the definition; and
    correlating all versions of the artifact definition to a single un-versioned definition, wherein the artifact definition of the single un-versioned definition is also correlated to all versions of the artifact definition.

2. The method of claim 1, wherein generating metadata further comprises:
    assigning a unique identifier (UID) to the artifact which includes an invariant component, shared by all versions of the versioned definition as well as the un-versioned definition, wherein the UID is expressed in a first form as Versioned: <common UID>_<version ID> and a second form as Un-versioned: <common UID>, wherein a system uses the <common UID> fragment to identify all versions of a same artifact as well as an associated single un-versioned definition and wherein the UID is immutable throughout a life of an associated artifact; and
    generating fragments from facets of an attribute that, when changed, make instance data associated with the attribute incompatible with existing instances in the un-versioned domain, wherein specific facets are considered immutable for a life of the definition and when these specific facets are changed in the versioned domain the changes cause the system to identify the attribute as a brand new addition to a parent definition, wherein the UID is shared by both versioned attributes and un-versioned attributes in entirety and is expressed in a format of <UID>_<immutable facet 1 value>_< . . . >_<immutable facet n value>.

3. The method of claim 1, further comprising:
    updating the artifact definition in the versioned domain, wherein a user change to a latest version n of the artifact definition creates a new version n+1 including the user change, wherein the user change is one of an addition, a removal and a modify and for each user change a corresponding mapping to the un-versioned artifact definition is made to synchronize the un-versioned artifact definition wherein:
    in response to a change in a validation rule in the set of predefined validation rules associated with the attributes of the artifact definition, making no update to the un-versioned artifact definition;
    in response to a facet change that can be applied to the un-versioned artifact definition in a compatible way, changing the attribute in the un-versioned definition; and
    in response to a facet change that cannot be applied to the un-versioned artifact definition in a compatible way, adding a new attribute to the un-versioned definition using the set of predefined validation rules associated with the attributes of the versioned artifact definition.

4. The method of claim 1, wherein the set of predefined validation rules comprise one or more predefined validation rules associated with the attributes of the artifact definition and wherein the one or more rules in the set of predefined validation rules validate changes received against a particular version of the versioned definition using the one or more predefined validation rules in the versioned definition, whether the instance updated is an un-versioned instance or a versioned instance.

5. The method of claim 1, wherein the correlating further comprises a first level of correlation at an artifact level and a second level of correlation at an attribute level, wherein the correlation associates artifacts using unique identifiers as applicable to definitions and instances.

6. The method of claim 1, wherein a look up of one of the first part and the second part may be performed using a remaining one of the first part and the second part which also shares an invariant component, shared by all versions of the versioned definition as well as the un-versioned definition.

7. A computer program product for correlating artifacts between a versioned domain and an un-versioned domain, the computer program product comprising a computer readable storage medium having program instructions embodied therewith, the program instructions executable by a processor unit to cause the processor unit to:
 generate metadata having attributes of both of the versioned domain and the un-versioned domains, for an artifact in a set of artifacts, wherein the metadata is associated with the set of artifacts used in the versioned domain and the un-versioned domain;
 create an instance using a specific version of a versioned artifact definition, wherein the instance comprises a first part directly created from the versioned artifact definition and a second part created from an un-versioned artifact definition;
 specify linkages between a respective representation of the artifact in the versioned domain and the un-versioned domain, wherein a specified linkage defines a relationship between multiple versions of an artifact in the versioned domain to a single un-versioned representation of a same artifact in the un-versioned domain;
 in response to providing a set of facades comprising a versioned facade to update instances of the artifact from the versioned domain:
  receive a selection of the versioned facade to update instance data,
  in response to receiving the selection of the versioned facade, accessing only those attributes defined on a specific version of the versioned definition and a set of predefined validation rules for attributes of that specific version of the versioned definition,
  validate updates on the versioned facade directly against the specific version of the versioned definition, and
  in response to the updates being valid, look up corresponding attributes of the un-versioned facade and save in a same transaction to maintain synchronization between the versioned instances and the un-versioned instances of the definition; and
 correlate all versions of the artifact definition to a single un-versioned definition, wherein the artifact definition of the single un-versioned definition is also correlated to all versions of the artifact definition.

8. The computer program product of claim 7, wherein the program instructions executable by the processor unit to cause the processor unit to generate metadata further comprises program instructions executable by the processor unit to cause the processor unit to:
 assign a unique identifier (UID) to the artifact which includes an invariant component, shared by all versions of the versioned definition as well as the un-versioned definition, wherein the UID is expressed in a first form as Versioned: <common UID>_<version ID> and a second form as Un-versioned: <common UID>, wherein a system uses the <common UID> fragment to identify all versions of a same artifact as well as an associated single un-versioned definition and wherein the UID is immutable throughout a life of an associated artifact; and
 generate fragments from facets of an attribute that, when changed, make instance data associated with the attribute incompatible with existing instances in the un-versioned domain, wherein specific facets are considered immutable for a life of the definition and when these specific facets are changed in the versioned domain the changes cause the system to identify the attribute as a brand new addition to a parent definition, wherein the UID is shared by both versioned attributes and un-versioned attributes in entirety and is expressed in a format of <UID>_<immutable facet 1 value>_ <...>_<immutable facet n value>.

9. The computer program product of claim 7, further comprising program instructions executable by the processor unit to cause the processor unit to:
 update the artifact definition in the versioned domain, wherein a user change to a latest version n of the artifact definition creates a new version n+1 including the user change, wherein the user change is one of an addition, a removal and a modify and for each user change making a corresponding mapping to the un-versioned artifact definition to synchronize the un-versioned artifact definition wherein:
 in response to a change in a validation rule in the set of predefined validation rules associated with the attributes of the artifact definition, make no update to the un-versioned artifact definition;
 in response to a facet change that can be applied to the un-versioned artifact definition in a compatible way, change the attribute in the un-versioned definition; and
 in response to a facet change that cannot be applied to the un-versioned artifact definition in a compatible way, add a new attribute to the un-versioned definition using the set of predefined validation rules associated with the attributes of the versioned artifact definition.

10. The computer program product of claim 7, wherein the set of predefined validation rules comprise one or more predefined validation rules associated with the attributes of the artifact definition and wherein the one or more rules in the set of predefined validation rules validate changes received against a particular version of the versioned definition using the one or more predefined validation rules in the versioned definition, whether the instance updated is an un-versioned instance or a versioned instance.

11. The computer program product of claim 7, wherein the program instructions executable by the processor unit to cause the processor unit to correlate further comprises program instructions executable by the processor unit to cause the processor unit to correlate at a first level of correlation at an artifact level and at a second level of correlation at an attribute level, wherein the correlation associates artifacts using unique identifiers as applicable to definitions and instances.

12. The computer program product of claim 7, further comprising program instructions executable by the processor unit to cause the processor unit to look up one of the first part and the second part using a remaining one of the first part and the second part which also shares an invariant component, shared by all versions of the versioned definition as well as the un-versioned definition.

13. An apparatus for correlating artifacts between a versioned domain and an un-versioned domain, comprising:
a bus;
a memory connected to the bus, having program instructions embodied therewith;
a processor unit, wherein the processor unit executes the program instructions to cause the apparatus to:
generate metadata having attributes of both of the versioned domain and the un-versioned domains, for an artifact in a set of artifacts, wherein the metadata is associated with the set of artifacts used in the versioned domain and the un-versioned domain;
create an instance using a specific version of a versioned artifact definition, wherein the instance comprises a first part directly created from the versioned artifact definition and a second part created from an un-versioned artifact definition;
specify linkages between a respective representation of the artifact in the versioned domain and the un-versioned domain, wherein a specified linkage defines a relationship between multiple versions of an artifact in the versioned domain to a single un-versioned representation of a same artifact in the un-versioned domain;
in response to providing a set of facades comprising a versioned facade to update instances of the artifact from the versioned domain:
  receive a selection of an un-versioned facade to update instance data;
  in response to receiving the selection of the un-versioned facade, expose the attributes defined in all versions of the versioned definition as mapped to the corresponding attributes in the un-versioned definition;
  in response to changes made through the un-versioned facade, perform a lookup of the attributes in the corresponding versioned facade, wherein the changes are mapped to that corresponding versioned facade, and corresponding validation rules in the set of predefined validation rules are checked, as defined by the specific versioned definition; and
correlate all versions of the artifact definition to a single un-versioned definition, wherein the artifact definition of the single un-versioned definition is also correlated to all versions of the artifact definition.

14. The apparatus of claim 13, wherein the processor unit executes the program instructions to cause the apparatus to generate metadata further causes the apparatus to:
assign a unique identifier (UID) to the artifact which includes an invariant component, shared by all versions of the versioned definition as well as the un-versioned definition, wherein the UID is expressed in a first form as Versioned: <common UID>_<version ID> and a second form as Un-versioned: <common UID>, wherein a system uses the <common UID> fragment to identify all versions of a same artifact as well as an associated single un-versioned definition and wherein the UID is immutable throughout a life of an associated artifact; and
generate fragments from facets of an attribute that, when changed, make instance data associated with the attribute incompatible with existing instances in the un-versioned domain, wherein specific facets are considered immutable for a life of the definition and when these specific facets are changed in the versioned domain the changes cause the system to identify the attribute as a brand new addition to a parent definition, wherein the UID is shared by both versioned attributes and un-versioned attributes in entirety and is expressed in a format of <UID>_<immutable facet 1 value>_< . . . >_<immutable facet n value>.

15. The apparatus of claim 13, wherein the processor unit executes the program instructions to further cause the apparatus to:
update the artifact definition in the versioned domain, wherein a user change to a latest version n of the artifact definition creates a new version n+1 including the user change, wherein the user change is one of an addition, a removal and a modify and for each user change a corresponding mapping to the un-versioned artifact definition is made to synchronize the un-versioned artifact definition wherein:
in response to a change in a validation rule in the set of predefined validation rules associated with the attributes of the artifact definition, make no update to the un-versioned artifact definition;
in response to a facet change that can be applied to the un-versioned artifact definition in a compatible, way change the attribute in the un-versioned definition; and
in response to a facet change that cannot be applied to the un-versioned artifact definition in a compatible way, add a new attribute to the un-versioned definition using the set of predefined validation rules associated with the attributes of the versioned artifact definition.

16. The apparatus of claim 13, wherein the set of predefined validation rules comprise one or more predefined validation rules associated with the attributes of the artifact definition and wherein the one or more rules in the set of predefined validation rules validate changes received against a particular version of the versioned definition using the one or more predefined validation rules in the versioned definition, whether the instance updated is an un-versioned instance or a versioned instance.

17. The apparatus of claim 13, wherein the processor unit executes the program instructions to cause the apparatus to correlate further causes the apparatus to correlate at a first level of correlation at an artifact level and at a second level of correlation at an attribute level, wherein the correlation associates artifacts using unique identifiers as applicable to definitions and instances.

* * * * *